United States Patent
Witzel et al.

(10) Patent No.: US 9,782,926 B2
(45) Date of Patent: Oct. 10, 2017

(54) LAYING HEAD AND APPARATUS AND METHOD FOR MANUFACTURING A THREE-DIMENSIONAL PRE-FORM FOR A STRUCTURAL COMPONENT FROM A FIBER COMPOSITE MATERIAL

(71) Applicant: Compositence GmbH, Leonberg (DE)

(72) Inventors: Volker Witzel, Loechgau (DE); Ingo Karb, Weissach (DE)

(73) Assignee: COMPOSITENCE GMBH, Leonberg (DE)

( * ) Notice: Subject to any disclaimer, the term of this patent is extended or adjusted under 35 U.S.C. 154(b) by 223 days.

(21) Appl. No.: 14/394,182

(22) PCT Filed: Apr. 10, 2013

(86) PCT No.: PCT/EP2013/001056
§ 371 (c)(1),
(2) Date: Apr. 11, 2015

(87) PCT Pub. No.: WO2013/152853
PCT Pub. Date: Oct. 17, 2013

(65) Prior Publication Data
US 2015/0314522 A1    Nov. 5, 2015

(30) Foreign Application Priority Data
Apr. 13, 2012    (DE) .................. 10 2012 007 439

(51) Int. Cl.
*B29C 63/00*    (2006.01)
*B32B 38/00*    (2006.01)
(Continued)

(52) U.S. Cl.
CPC .......... *B29C 63/0021* (2013.01); *B29B 11/16* (2013.01); *B29C 70/388* (2013.01);
(Continued)

(58) Field of Classification Search
CPC ... B29C 70/543; B29C 63/0021; B29B 11/16; B29B 15/122; B32B 38/0004;
(Continued)

(56) References Cited

U.S. PATENT DOCUMENTS 2,964,442 A    12/1960 Gunnar
3,115,678 A    12/1963 Keen
(Continued)

FOREIGN PATENT DOCUMENTS

CN    101304859 B    11/2008
CN    101657575 B    2/2010
(Continued)

OTHER PUBLICATIONS

Office Action from the Japanese Patent Office dated Nov. 29, 2016 in counterpart Japanese application No. 2015-504879, and translation of substantive portions thereof.
(Continued)

*Primary Examiner* — Vishal I Patel
(74) *Attorney, Agent, or Firm* — J-Tek Law PLLC; Jeffrey D. Tekanic; Scott T. Wakeman

(57) ABSTRACT

A laying head for manufacturing a three-dimensional preform includes an inlet configured to feed in a plurality of dry rovings. A fiber conveying device simultaneously and mutually-independently conveys, in a fiber supplying direction, the rovings fed-in via the inlet. An outlet is arranged downstream of the fiber conveying device in the fiber supplying direction and simultaneously lays the plurality of rovings on a workpiece carrier to manufacture the three-dimensional preform. A fiber-cutting device is disposed downstream of the fiber conveying device and upstream of the outlet in the fiber supplying direction and cuts the rovings. A nozzle applies a medium onto the rovings. A slit-shaped through gap of the nozzle has a height is equal to (Continued)

the height of the dry rovings in the thickness direction plus a margin that is sufficiently small so as to cause the medium to be forcibly embedded into the dry rovings.

3 Claims, 6 Drawing Sheets

(51) Int. Cl.
| | |
|---|---|
| B32B 38/08 | (2006.01) |
| B32B 38/18 | (2006.01) |
| B29C 70/38 | (2006.01) |
| B29C 70/54 | (2006.01) |
| B29B 11/16 | (2006.01) |
| B29L 9/00 | (2006.01) |
| B33Y 30/00 | (2015.01) |
| B33Y 10/00 | (2015.01) |
| B33Y 40/00 | (2015.01) |
| B29B 15/12 | (2006.01) |

(52) U.S. Cl.
CPC ........ *B29C 70/543* (2013.01); *B32B 38/0004* (2013.01); *B32B 38/08* (2013.01); *B32B 38/1808* (2013.01); *B29B 15/122* (2013.01); *B29L 2009/00* (2013.01); *B32B 2260/00* (2013.01); *B33Y 10/00* (2014.12); *B33Y 30/00* (2014.12); *B33Y 40/00* (2014.12); *Y10T 156/12* (2015.01)

(58) Field of Classification Search
CPC . B32B 38/1808; B32B 38/08; B32B 2260/00; Y10T 156/12; B29L 2009/00; B33Y 30/00; B33Y 10/00; B33Y 40/00
See application file for complete search history.

(56) References Cited

U.S. PATENT DOCUMENTS

| | | | |
|---|---|---|---|
| 4,432,716 A | 2/1984 | Kiss | |
| 5,134,002 A | 7/1992 | Vallier | |
| 5,344,687 A | 9/1994 | Grimnes | |
| 5,645,677 A | 7/1997 | Cahuzac et al. | |
| 5,766,357 A * | 6/1998 | Packer ................. | B29B 15/122 |
| | | | 118/307 |
| 6,054,003 A | 4/2000 | Bak et al. | |
| 6,585,842 B1 | 7/2003 | Bompard et al. | |
| 8,580,060 B2 | 11/2013 | Bech | |
| 2003/0133691 A1 | 7/2003 | Levert et al. | |
| 2005/0139324 A1 | 6/2005 | Meyer | |
| 2005/0268832 A1 | 12/2005 | Beneventi et al. | |
| 2006/0169396 A1 | 8/2006 | Joern | |
| 2009/0202789 A1 | 8/2009 | Wagner et al. | |
| 2009/0229760 A1 * | 9/2009 | Hamlyn ................. | B29C 70/384 |
| | | | 156/433 |
| 2010/0126652 A1 | 5/2010 | Joern et al. | |
| 2010/0170628 A1 | 7/2010 | Yoshikawa et al. | |
| 2010/0206994 A1 | 8/2010 | Barber | |
| 2011/0000608 A1 | 1/2011 | Bech | |
| 2011/0083605 A1 | 4/2011 | Vermilyea et al. | |
| 2011/0104364 A1 | 5/2011 | Chen | |
| 2011/0115124 A1 | 5/2011 | Barlag | |
| 2011/0148007 A1 | 6/2011 | Piepenbrock et al. | |
| 2012/0073726 A1 * | 3/2012 | Koeniger ............. | B29C 70/382 |
| | | | 156/64 |
| 2012/0073730 A1 | 3/2012 | Nieuwenhove et al. | |
| 2012/0247651 A1 | 10/2012 | Nieuwenhove et al. | |
| 2013/0174969 A1 | 7/2013 | Karb et al. | |
| 2013/0175723 A1 | 7/2013 | Luebbering et al. | |
| 2014/0035195 A1 | 2/2014 | Goettinger et al. | |
| 2014/0041795 A1 | 2/2014 | Goettinger et al. | |
| 2014/0103571 A1 | 4/2014 | Karb et al. | |
| 2014/0131914 A1 | 5/2014 | Goettinger et al. | |

FOREIGN PATENT DOCUMENTS

| | | |
|---|---|---|
| DE | 3003666 A | 8/1981 |
| DE | 3027655 A | 9/1981 |
| DE | 4115831 A | 11/1992 |
| DE | 10005202 A | 11/2000 |
| DE | 19922799 A1 | 11/2000 |
| DE | 10250826 A | 5/2004 |
| DE | 102008019147 A | 10/2009 |
| DE | 102010015199 A1 | 10/2011 |
| EP | 0415870 A | 3/1991 |
| EP | 0626252 A | 11/1994 |
| EP | 1584462 A | 10/2005 |
| EP | 1724098 A | 11/2006 |
| EP | 2159310 A | 3/2010 |
| EP | 2314435 A2 | 4/2011 |
| EP | 2433784 A1 | 3/2012 |
| GB | 2452298 A | 3/2009 |
| JP | S50129662 A | 10/1975 |
| JP | S6417723 U | 1/1989 |
| JP | H03287824 A | 12/1991 |
| JP | 2008538094 A | 10/2008 |
| WO | 03099545 A | 12/2003 |
| WO | 2008056980 A | 5/2008 |
| WO | 2009077581 A2 | 6/2009 |
| WO | 2009124724 A1 | 10/2009 |
| WO | 2009127456 A1 | 10/2009 |
| WO | 2009158262 A1 | 12/2009 |
| WO | 2011128110 A1 | 10/2011 |
| WO | 2012035105 A1 | 3/2012 |
| WO | 2012136391 A1 | 10/2012 |
| WO | 2012136392 A1 | 10/2012 |
| WO | 2012136393 A1 | 10/2012 |
| WO | 2012136394 A1 | 10/2012 |

OTHER PUBLICATIONS

Communication dated Feb. 10, 2015 from EPO in related EP application No. 12 713 881.6, including English translation of substantive portions Communication dated Jul. 10, 2014 from EPO in related EP application No. 12 713 881.6, including English translation of substantive portions.

English translation of International Search Report for parent PCT application No. PCT/EP2013/001056.

English translation of Written Opinion for parent PCT application No. PCT/EP2013/001056.

Office Action dated Apr. 2, 2015 in related U.S. Appl. No. 13/641,247.

Office Action dated Aug. 4, 2016 in U.S. Appl. No. 14/115,552.

* cited by examiner

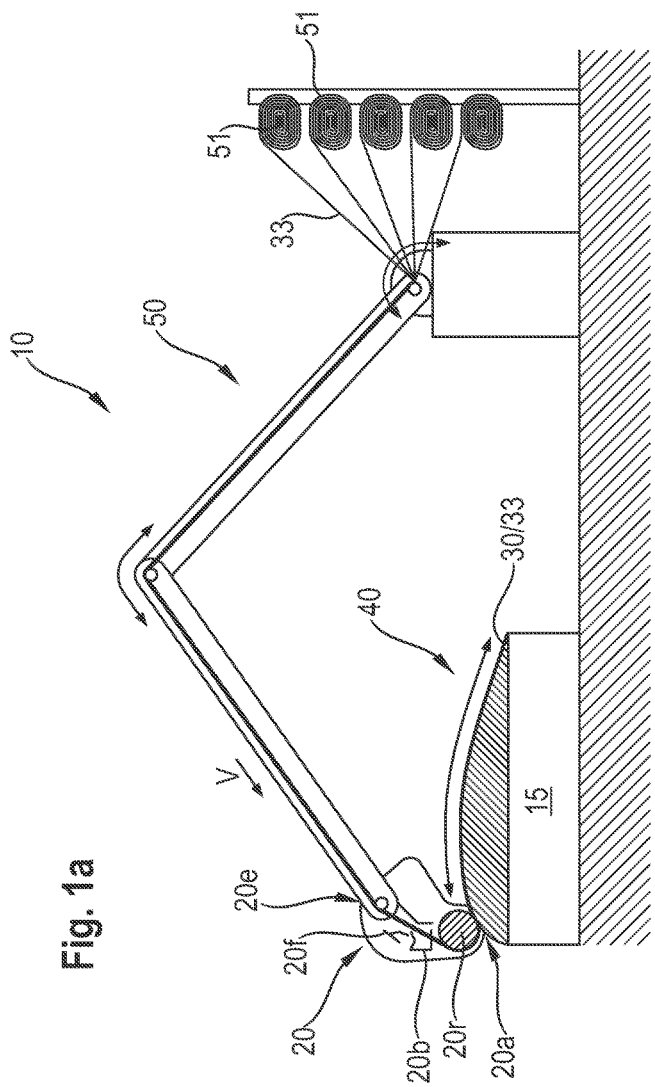

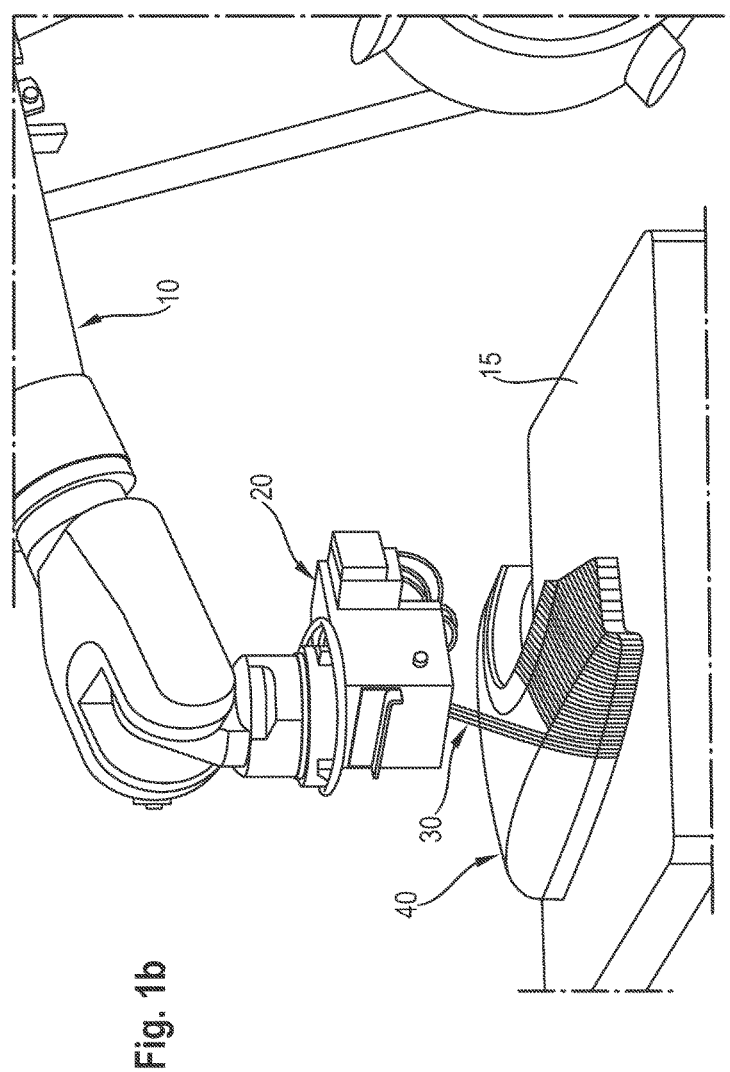

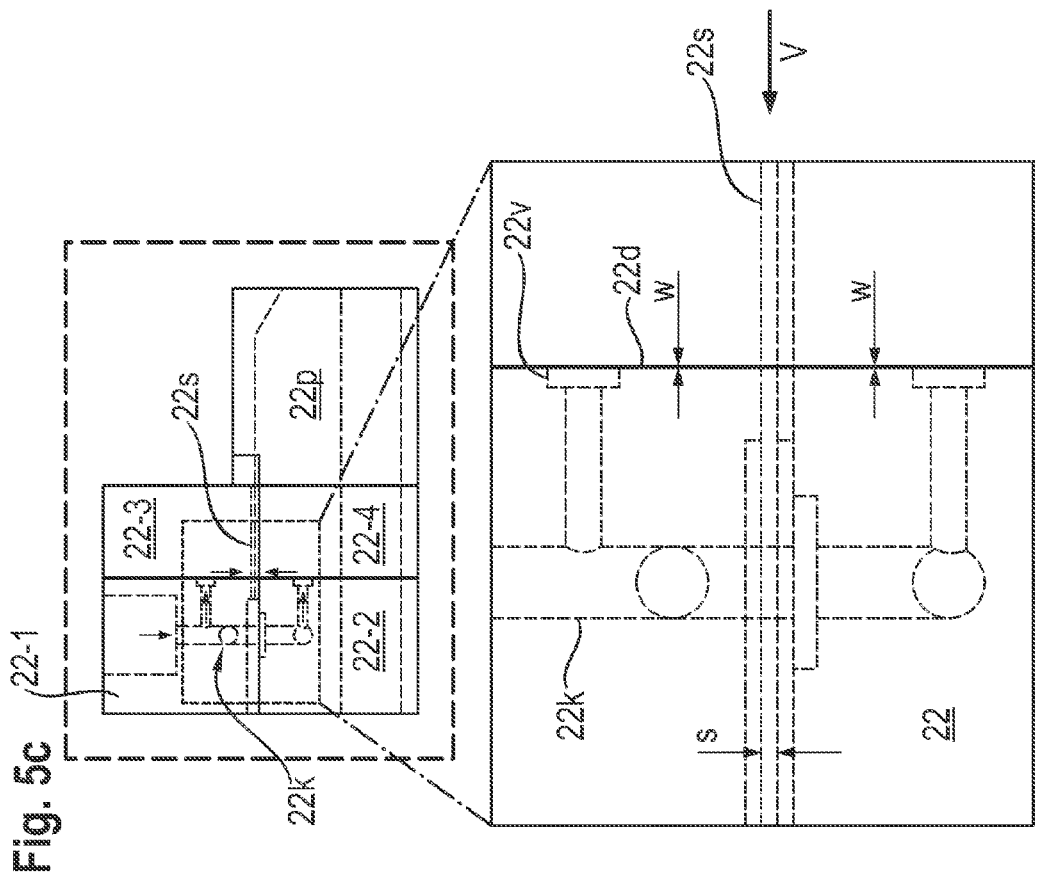
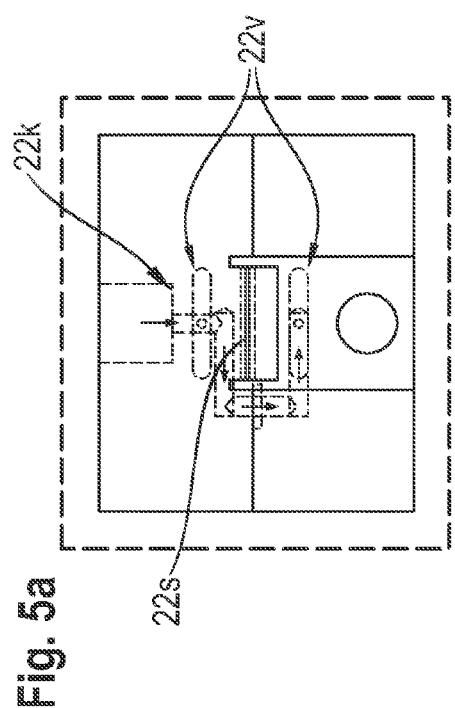
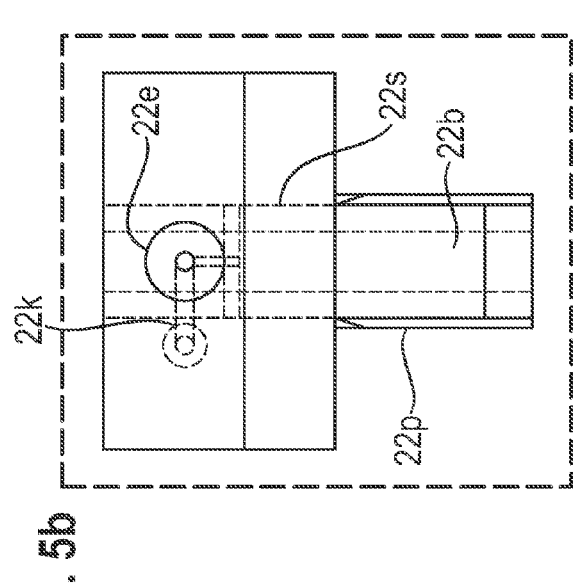

LAYING HEAD AND APPARATUS AND METHOD FOR MANUFACTURING A THREE-DIMENSIONAL PRE-FORM FOR A STRUCTURAL COMPONENT FROM A FIBER COMPOSITE MATERIAL

CROSS-REFERENCE

This application is the U.S. national stage of International Application No. PCT/EP2013/001056 filed on Apr. 10, 2013, which claims priority to German patent application no. 10 2012 007 439.5 filed on Apr. 13, 2012.

TECHNICAL FIELD

The present invention relates to a laying head and to an apparatus and a method for manufacturing a three-dimensional preform for a structural component from a fiber composite material.

RELATED ART

A laying head, an apparatus and a method for manufacturing a three-dimensional preform for a structural component from a fiber composite material are known from WO 2011/128110 A1. Reference is made to the description of the prior art and the technical background on pages 1 to 3 of this printed publication. It is taught in the printed publication how a plurality of dry rovings can be supplied to a laying head and can be laid on a corresponding three-dimensional workpiece carrier for forming a three-dimensional preform, in order to manufacture a structural component preform for a structural component made of fiber composite materials.

In this respect, so-called rovings are the starting material, as in the present application. A roving is a yarn that is comprised of a plurality of filaments made of the fiber material, which one could characterize as the actual fibers. Carbon fibers, glass fibers, aramid fibers, etc. are preferably used as fiber composite materials. Such a roving can be comprised of several, such as e.g., 8 or 10, filaments up to some 10,000 or more filaments. A 50 k roving is comprised, for example, of 50,000 filaments.

In the present application, the term fiber indicates a roving except when reference is explicitly made to individual filaments.

WO 2011/128110 A1 discloses the fixing of the beginnings and ends of the rovings at the edge of the workpiece carrier using adhesive.

Further devices and methods for attaching or embedding adhesive onto or into rovings are known from WO 2009/077581 A2, EP 2 433 784 A1, WO 2009/158262 A1 and US 2011/0083605 A1.

SUMMARY

In view of the above-noted problems, improved techniques for fixing the rovings and for applying media such as adhesive, binders, impregnating resins and the like are disclosed herein.

In one aspect of the present teachings, a laying head for manufacturing a three-dimensional preform includes an inlet configured to feed in a plurality of dry rovings. A fiber conveying device simultaneously and mutually-independently conveys, in a fiber supplying direction, the rovings fed-in via the inlet. An outlet is arranged downstream of the fiber conveying device in the fiber supplying direction and simultaneously lays the plurality of rovings on a workpiece carrier to manufacture the three-dimensional preform. A fiber-cutting device is disposed downstream of the fiber conveying device and upstream of the outlet in the fiber supplying direction and cuts the rovings. A nozzle applies a medium onto the rovings. A slit-shaped through gap(s) of the nozzle has/have a height is equal to the height of the dry rovings in the thickness direction plus a margin that is sufficiently small so as to cause the medium to be forcibly embedded (impregnated, permeated, introduced, penetrated) into the dry rovings.

In particular, it is made possible to impregnate a medium into the rovings by using a nozzle, i.e. to not only apply the medium, such as an adhesive, a binder or a resin onto a roving from the outside, but also to permeate the roving with the medium.

This makes possible a fixing of the to-be-laid fiber set or rovings in the fixing area of the workpiece carrier with a low cutting waste.

The process stability can be enhanced because all filaments are embedded in adhesive/binder/resin at the ends of the corresponding rovings, and thereby cannot be moved unexpectedly somewhere else.

In a preferred embodiment, the segments of the rovings impregnated with adhesive can be centrally severed at the end of a laying path such that the adhering portion for the end fixing of the rovings of the current laying path and the adhering portion for the start fixing of the next laying path are simultaneously obtained.

BRIEF DESCRIPTION OF THE DRAWINGS

Further features and advantages will be apparent from the description of embodiments referring to the drawings.

FIG. 1a shows a schematic view of a robot with a laying head, roving bobbins and a workpiece carrier, and FIG. 1b shows a view of the front end of the robot with a laying head during the laying of a fiber set onto the workpiece carrier.

FIG. 5a shows a front view of the nozzle of FIG. 4a, FIG. 5b shows a top view of the nozzle of FIG. 5a, and the upper portion of FIG. 5c shows a side view of the nozzle of FIG. 5a the lower portion of FIG. 5c shows an enlarged view of the above portion surrounded with a dashed line.

DETAILED DESCRIPTION OF THE INVENTION

Figure 2A:
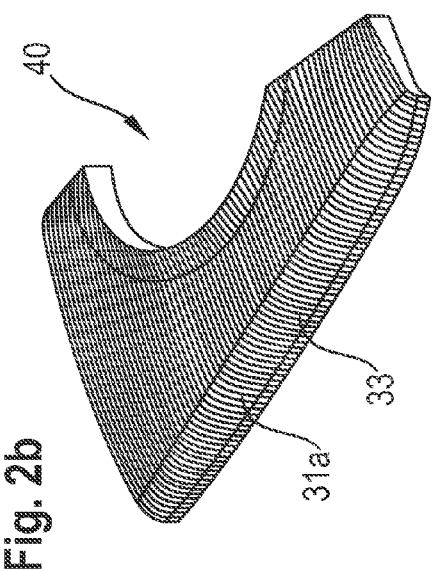
FIG. 2a shows a view of a workpiece carrier, and in FIGS. 2b, 2c and 2d show fiber layers laid on the workpiece carrier.

FIGS. 1a and 1b schematically show a robot 10, to which a laying head 20 is attached. A workpiece carrier 40 is held on a support 15 for the workpiece carrier. It is schematically shown that the laying head 20 is configured to simultaneously lay a fiber set 30 made of plural rovings onto the workpiece carrier 40. In FIG. 1a), 5 bobbins 51 of a fiber supplying mechanism 50 are shown, onto which the fibers (rovings) 33 are wound and from where they are supplied to the laying head 20 via the fiber supplying mechanism 50. In FIG. 1b), only 4 rovings are schematically shown. The fiber set 30 can comprise a plurality n of rovings, where n=2, 3 . . . , wherein n=8 or n=16 or n=32 are presently preferred.

The arrangement serves to manufacture a three-dimensional preform for a structural component made of a fiber composite material having a multi-layer, multi-axial fiber architecture (MAFA) similar to a multi-axial fabric (MAF).

The fiber supplying mechanism 50 preferably includes a fiber guiding mechanism, which is preferably configured in the manner that is shown in FIGS. 12, 13 of WO 2011/128110 A1 and is described with respect to these figures.

According to one embodiment, the workpiece carrier 40 has a workpiece forming area 41 and an edge-fixing area 42, as shown in FIG. 2a). The workpiece forming area 41 corresponds to the desired three-dimensional shape of the preform. The edge-fixing area 42 serves to fix the rovings 33 in the edge area of the workpiece carrier 40.

Figure 2B:
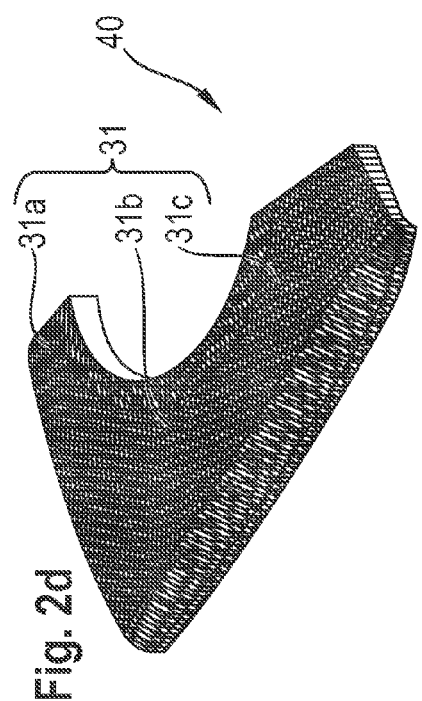
Figure 2C:
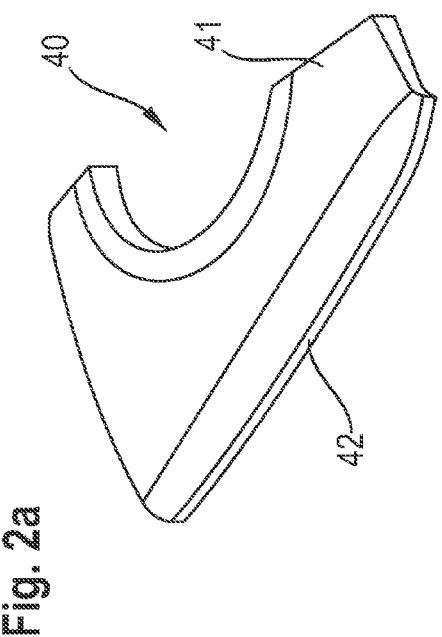
Figure 2D:
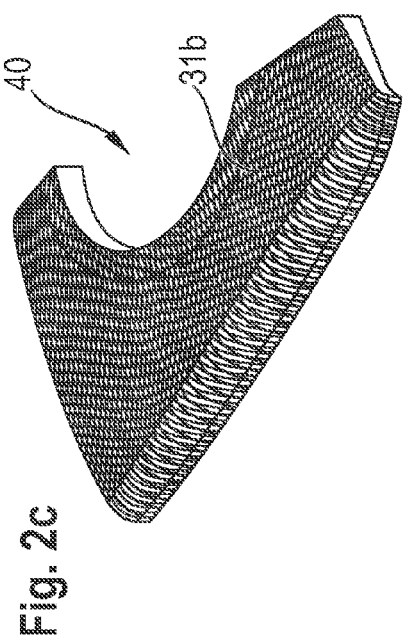

In FIG. 2b), the workpiece carrier is shown with a first fiber layer 31a, which has been laid on the workpiece carrier in a first orientation (=axial direction). As indicated in FIG. 2b), the fiber layer 31a is comprised of rovings 33 that have been laid in this axial direction. In FIG. 2c), the same workpiece carrier 40 is shown, on which a second fiber layer 31b has been laid over the first fiber layer 31a. The fibers of the second fiber layer 31b have an orientation of −45 degrees relative to the orientation of the first fiber layer 31a. It is shown in FIG. 2d) how a third fiber layer 31c has been laid over the second fiber layer 31b, wherein it has been laid only on a part of the workpiece carrier 40. The third layer 31c has an orientation of +45 degrees relative to the first layer and thus of 90 degrees relative to the second layer 31b. The three layers 31a to 31c form a multi-layer, multi-axial fiber architecture (MAFA) 31.

Again referring to FIG. 1a), it can be recognized that the laying head 20 has an inlet 20e, via which the dry rovings 33 are supplied to the laying head. The laying head 20 further has an outlet 20a, from which the rovings 33 are output for laying onto the workpiece carrier 40, wherein a pressing roller 20r is arranged at the output 20a, using which the outputted rovings 33 can be pressed, if necessary, against the workpiece carrier 40. In FIG. 1a), a fiber supplying direction V for the direction of the conveying or feeding of the rovings 33 is indicated. A fiber conveying device 20f is provided downstream of the inlet 20e of the laying head 20 in the fiber supplying direction V. This fiber conveying device can be implemented, for example, by a conveying unit as described in US 2009/0229760 A1. In principle, such a fiber supply according to the Eytelwein principle is known. As for the rest concerning the fiber conveying device, reference is made to the above-mentioned US 2009/0229760 A1 and the above-mentioned WO 2011/128110 A1.

Figure 3A:
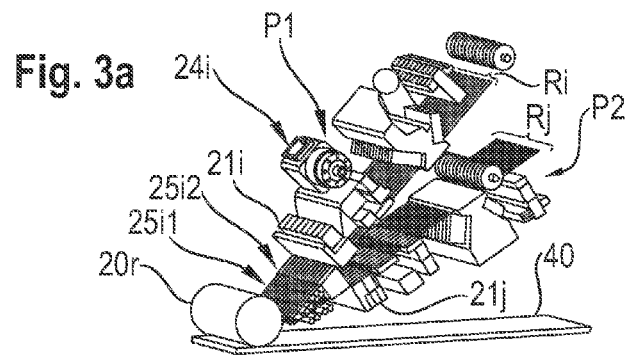
FIG. 3a shows a perspective view of a portion of a laying head according to a first embodiment.
Figure 3B:
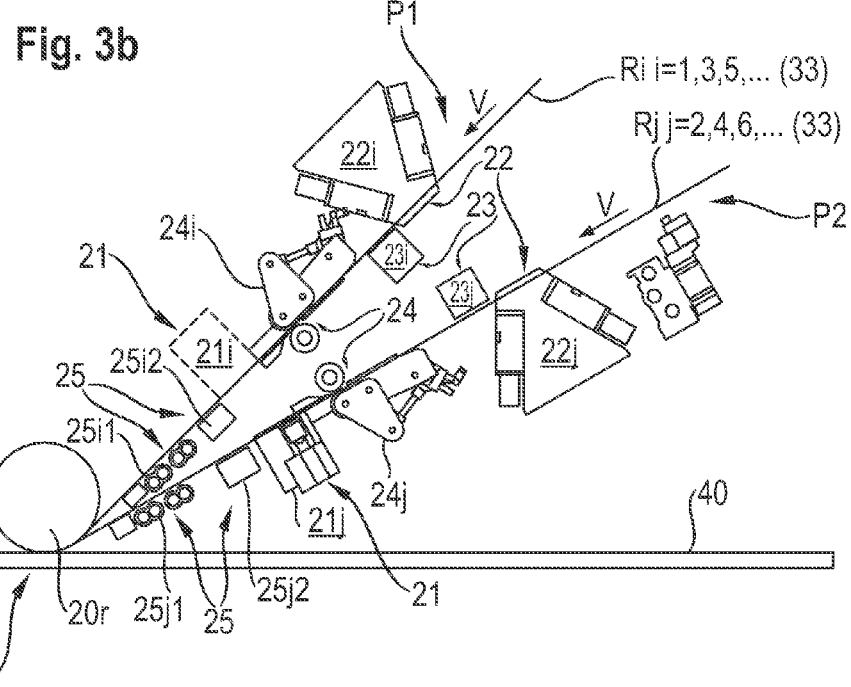
FIG. 3b shows a side view of a portion of the laying head.

A fiber treatment unit 20b is schematically shown in FIG. 1a) downstream of the fiber conveying device 20f in the fiber supplying direction V. This fiber treatment unit 20b will be described in more detail in the following with reference to FIGS. 3a) and b). In FIG. 3a), the portion 20b of the laying head for guiding and treatment of the rovings 33 or Ri, Rj, respectively, is shown in a perspective view in the supply direction V downstream of the fiber conveying device 20f until the pressing roller 20r. In FIG. 3b), the same segment 20b of the interior of the laying head 20 is schematically shown in a side view. In the depicted embodiment of the laying head, the rovings 33 supplied via the inlet 20e into the laying head 20 are divided into two groups of rovings Ri (i=1, 3, 5 . . . ) and Rj (=2, 4, 6 . . . ). Group Ri includes the even-numbered rovings 33 and group Rj includes the odd-numbered rovings 33. In the depicted embodiment, n=16, such that 8 rovings are present in group Ri (I=1, . . . 15) and 8 rovings are present in group Rj (j=2, . . . 16). Groups Ri and Rj are guided and treated on two separated paths P1 and P2.

The division into the two groups and into the separate paths P1 and P2 is not necessary. A single path without division could be present, too. On the other hand, a plurality of more than two groups and paths could be implemented as well.

The treatment unit 20b for path P1 will be described in the following. The description applies in an analogous manner for path P2. The reference numerals indicated with i for path P1 have a j instead of an i for path P2.

The rovings 33, Ri are conveyed by the fiber conveying device 20f in the fiber supplying direction V and arrive downstream at a nozzle 22, 22i for applying and embedding a medium M into the rovings, which will be described in more detail hereinafter. The nozzle is adapted for applying a medium (adhesive, binder, resin, and the like) in such a manner that the medium is applied onto both sides of the rovings and is embedded (is impregnated) into the rovings. This applying and embedding on both sides can be done continuously or clocked in sections.

In the following, a corresponding description is provided for the case, in which the medium is a so-called Hot-Melt Adhesive. Such a Hot-Melt Adhesive is adhesive above a predetermined temperature and is not adhesive below the predetermined temperature (hereinafter indicated as the adhering temperature) but is still elastic over a significant temperature range.

When using such a Hot-Melt Adhesive, it is preferred that a cooling device 23, 23i for cooling the rovings having the applied and embedded adhesive to below the adhering temperature is provided downstream of the nozzle 22 in the supplying direction V.

In the treatment unit 20b of the embodiment shown in FIG. 3, an intermediate conveying device 24, 24i is preferably provided downstream of the nozzle 22 in the supplying direction V, when the cooling device 23 is present, then preferably downstream of the cooling device 23. The intermediate conveying device serves to reliably convey the rovings downstream of the nozzle 22. A fiber-cutting device 21, 21i is provided downstream of the nozzle 22 in the supplying direction V and, when the cooling device 23 and/or the intermediate conveying device 24 is present, then preferably downstream of these devices. The fiber-cutting device 21 is adapted to cut the rovings. Reference is made to FIG. 9 of WO 2011/128110 A1 and the corresponding description with regard to concrete embodiments of the fiber-cutting device.

As was already explained above, a pressing roller 20r is arranged at the outlet 20a of the laying head 20. A heating device 25, 25i1, 25i2 is provided upstream of the pressing roller 20r and downstream of the fiber cutting device 21, 21i in the supplying direction V. In the depicted embodiment, the heating device 25i includes two elements indicated with 25i1 and 25i2. The first element 25i1 provided closer to the pressing roller 25r in the supplying direction V is an end-heater that serves to again heat the adhesive applied onto and embedded into the rovings 33Ri above the adhering temperature (e.g., 100° C.). The second element 25i2 is a heater for maintaining a predetermined temperature (e.g., 70° C.) of the rovings (temperature holding heater).

When the rovings 33Ri have been cut by the fiber cutting device 21, 21i, the end of the rovings 33Ri positioned upstream of the cutting plane can thus include adhesive. In order to prevent this adhesive from cooling down too far below the adhering temperature, this portion of the rovings can be kept at a temperature below, but close to, the adhering temperature by using the temperature-holding heater 25i2.

The laying head 20 and the robot 10 as well as the individual components of the laying head 20 are controlled by a not-shown control device.

The workpiece carrier 40 is shown in FIG. 3 as a planar workpiece carrier. This serves merely for simplification of the illustration.

In the following, the design of the nozzle 22, 22i, 22j will be described in more detail with reference to FIGS. 4 and 5.

Figure 4A:
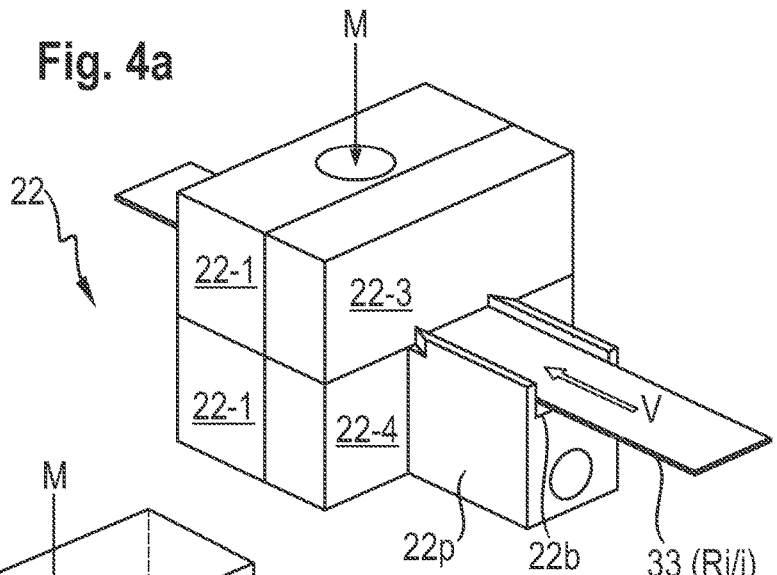
FIG. 4a shows a schematic perspective view of a nozzle according to one embodiment of the present teachings.
Figure 4B:
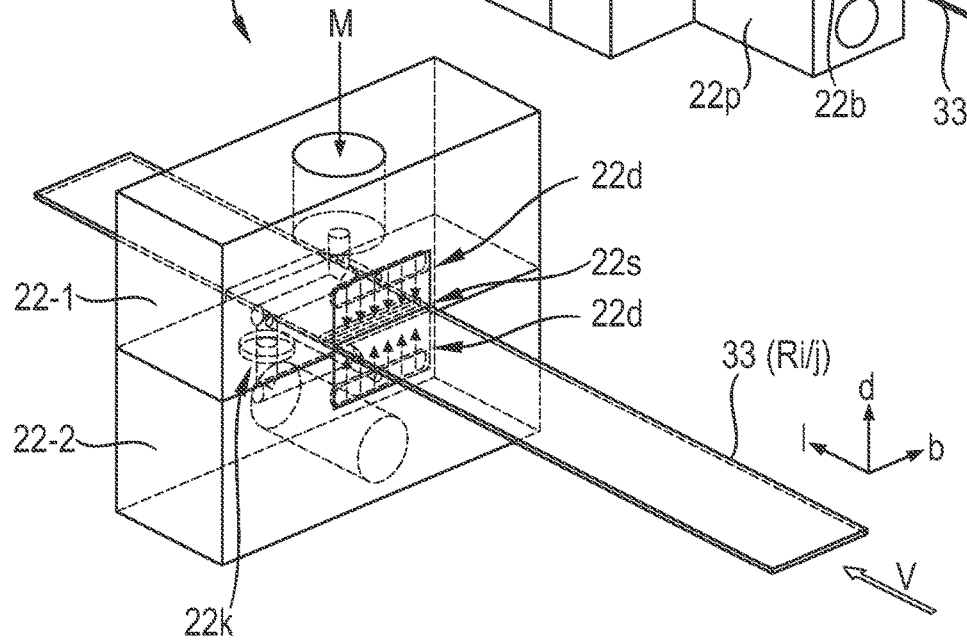
FIG. 4b shows a perspective schematic view of a rear portion of the nozzle of FIG. 4a, and FIG. 4c shows a front view of the portion of FIG. 4b.
Figure 4C:
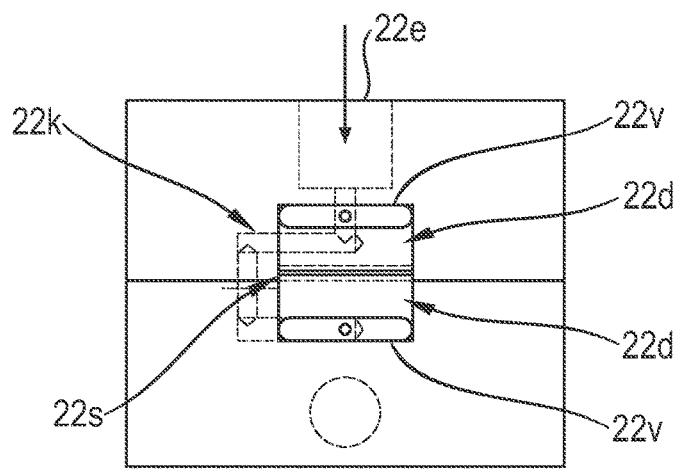

In FIG. 4a), a perspective view of the nozzle 22 is shown in a schematic illustration. A roving 33 is supplied in the supplying direction V into the nozzle 22 via a guiding path 22b formed on a protrusion 22P, which guiding path 22b is planar in the depicted embodiment. The medium (e.g., adhesive) M is supplied via an opening provided on the upper side. In FIG. 4a), the body of the nozzle 22 downstream of the protrusion is shown as being comprised of four parts 22-1 to 22-4, which are held together by screws (not shown). This can also be easily recognized in the side view of FIG. 5c). In FIGS. 4b) and c), only the rear portion is shown. A coordinate system l-d-b is introduced to describe the formation of the nozzle 22 and the adaptation to the feeding-through of the rovings 33, in which coordinate system axis l points in the longitudinal direction of the rovings 33, which corresponds to the supplying direction V, direction d points in the direction of the thickness of the rovings, and direction b points in the direction of the width of the rovings. As can be easily recognized in FIGS. 4b), c) and 5a) to c), the nozzle 22 has a slit 22s that is adapted in its height and width to the dimensions of the to-be-fed-through rovings 33. The height s in direction d of the slit corresponds to the height of the rovings 33 with a predetermined margin. The slit 22s thus extends in a slit plane l-b with a height s in the thickness direction perpendicular to the slit plane l-b. The determination of the margin will be explained in the following. The width of the slit 22s, which is not provided with a reference numeral, corresponds to the width of the rovings with a like-wise predetermined margin.

The nozzle has a channel system 22k that feeds two dispensers 22v with the medium M supplied via the inlet 22e. In case of the Hot-Melt Adhesive, the same is supplied via the inlet 22e at a pressure of, for example, 50 bar.

One dispenser 22v is respectively provided in the nozzle 22 above and below the feed-through slit 22s. An adhesive applier formed as a nozzle gap 22d leads from the dispenser 22v located above the feed-through slit 22s to the feed-through slit. The nozzle gap 22d preferably has the width of the slit 22s. In the same manner, an adhesive applier formed as a nozzle gap 22d leads from the dispenser 22v located below the feed-through slit 22s to the same.

When the medium M is supplied accordingly, it is thus applied to the upper side and to the lower side of a fed-through roving 33 via the nozzle gap 22d. By moving the roving in supplying direction V, it can be applied, in accordance with the controlled supply, section-wise or clocked or continuously.

In order to not only apply the adhesive onto the roving but also to impregnate it into the roving, the dimensions of the feed-through slit 22s are adapted in accordance with the dimensions of the roving and the nature of the adhesive or of another medium as well as the supply pressure.

An impregnation is thereby made possible without a redirection of the rovings perpendicular to the supplying direction V. Furthermore, it is made possible to stop the adhesive application in a defined manner. An interruption of the adhesive supply by closing a valve leads to a loss of pressure and thus to an abrupt end of the application.

For a typical Hot-Melt Adhesive having an adhering temperature of approx. 150° C. and a supply pressure of approx. 50 bar, a margin of 0.05 to 0.1 mm can be selected for a 50 k roving having a 12 mm width and a thickness of approx. 0.3 mm to 0.35 mm in order to not only apply the Hot-Melt Adhesive onto the roving, but to also embed the same into the roving, i.e. in order to impregnate the same. In such a case, the height of the slit 22s is thus, e.g., 0.4 mm. The open width w of the gap 22d falls then in the range of 0.025 to 1 mm, thus, e.g., 0.05 mm.

Assisting measures such as a light combing of the rovings directly before the medium supply or the like are possible for the assistance (see also the fiber preparation described in WO 2011/128110 A1). In general, for rovings having widths in the range of 5 to 100 mm and thicknesses in the range of 0.2 to 0.6 mm, the margin should be in the range of 0.025 to 0.2 mm in the height direction d and/or in the width direction b.

For a roving and material combination, in which the impregnating is easy, a single feed-through slit can be provided for all or plural rovings of one supply path P1, P2. It is, however, preferable to provide a separate feed-through slit 22s per individual roving.

In particular, adhesives that are suitable for the start and end fixation of the fiber layers 31a, b, c or their intermediate fixation, such as, for example, adhesives based on EVA or polyolefin or epoxy, are possibilities as the media. Binders and resins also are possibilities as the media. In this respect, binders are used to apply the dry rovings with binder when laying the same, in order to obtain an easily-manageable, dry (e.g. including no resin) preform and to avoid a slippage of the fibers during preform manufacturing. The application and embedding of resin can be used so that the resin does not have to be embedded into the preform in a process subsequent to the formation of the preform, but rather the impregnation with the resin occurs directly when laying the fibers (Online-Prepregging). If plural media should be applied, a separate nozzle 22 for each medium can be provided in each path P1, P2.

With respect to the binders and the resin, it noted that the application in the laying head 20, in particular with the described nozzle 22, makes possible the handling of dry rovings from the bobbin until downstream of the fiber conveying device in the laying head 20 and thus high velocities, etc.

The described laying head or an apparatus for manufacturing a three-dimensional preform for a structural member made of a fiber composite material using such a laying head can thus be used with a method of the type described in WO 2011/128110 A1 in a very advantageous manner and can further improve the same.

In particular, a further improvement of a method for manufacturing a preform for a structural member from a fiber composite material is made possible, in which the fixation of the end portions of the rovings on both sides of a cutting can be achieved in a very advantageous manner.

Figure 6A:
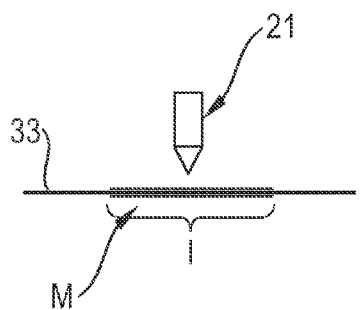
FIG. 6a shows a schematic illustration of an impregnated roving before it is cut and FIG. 6b shows the impregnated roving after it has been cut.
Figure 6B:
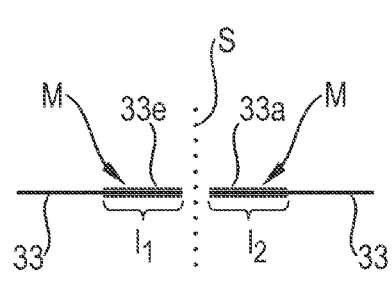

This will be explained with reference to a case, in which dry rovings are laid on the workpiece carrier 40. A roving 33 is, as can be seen in FIG. 6a), coated over a predetermined length l with the medium M, which is a Hot-Melt Adhesive in this case, and is eventually impregnated. The length l shown in FIG. 6a) includes at least the predetermined lengths l1 and l2 shown in FIG. 6b), i.e. l≥l1+l2. The roving 33 is cut by the fiber cutting device 21 at a position determined such that, after the performance of the cutting along the cutting plane S, the end 33e can be fixed at the end of a laying path in the edge-fixing area with the adhesive M over the first predetermined length l1. On the other side of the cut S, the adhesive M is present with the second predetermined length l2 at the downstream front end of the remaining portion of the roving 33, with which the roving 33 can be fixed on the workpiece carrier 40 at the beginning of the laying of the next laying path.

In general, this is not limited to an edge fixation but can also be applied in an analogous manner to the application of intermediate reinforcements or the like.

In the described embodiment the nozzle gaps end on one line relative to the supplying direction. Alternatively, they could also be offset in the supplying direction V. The nozzle gaps are preferably formed in a linear manner. Alternatively, holes arranged in a linear manner or in a matrix are possible as the outlet of the media applicator 22d. The downstream lip of the nozzle gap 22d can be formed protruding into the slit 22s, in order to perform a scraping (wiping) function.

The design of the nozzle 22 with the four parts 22-1 to 22-4 makes it possible to provide the nozzle gap 22d and the slit 22s at the front faces of the four parts, which enables a simple manufacturing.

It is explicitly emphasized that the individual elements and method steps which have been described are also disclosed separately as independent subject-matters. For example, the configuration of the nozzle 22 is independent of the precise configuration of the laying head or of the placement within a laying head. The method described with respect to FIG. 6 also can generally be implemented without the laying head and/or the described nozzle. The same applies in an analogous manner to the other described elements and method steps such as the heating device, the cooling device, the division of the paths, etc.

In the above-described embodiment, the medium such as, e.g., the adhesive is applied to and embedded into the rovings on both sides. The construction of the nozzle has been adapted in a corresponding manner. Alternatively, it is possible to achieve an application and embedding of the medium onto and into the rovings 33 with a single-sided media supply, as described hereinafter. The previous approaches to applying media such as adhesive, binder, resin have, in essence, taught a type of contact-less or pressure-less application. The above-described nozzle results in that the medium is not only brought into contact with the rovings but is also pressed into the roving. This can also be achieved with a single-sided media supply, i.e. in case, e.g., only the upper nozzle 22d in FIGS. 4, 5 is present, in case the medium is nevertheless pressed under pressure into the roving. This is achieved by having a type of counter bearing present on the other side of the roving, i.e. the opposite side of the feed-through slit 22s, so that the medium is pressed under pressure into the roving. To promote the impregnation, in particular in the case of a single-sided media supply, it is preferable to reduce the area density of the roving. This can be achieved, for example, by combing, spreading or other known measures for reducing the area density. In the present application, a single-sided or two-sided application refers to the width sides of the roving, i.e. to the sides extending in the plane l-b in FIG. 4b).

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A laying head, comprising:
an inlet configured to feed in a plurality of dry rovings, each dry roving having a roving width in the range of 5 to 100 mm and a roving thickness in the range of 0.2 to 0.6 mm;
a fiber conveying device configured to simultaneously and mutually-independently convey, in a fiber supplying direction, the rovings fed-in via the inlet;
a nozzle having a slit-shape through gap configured to apply a medium onto, and to embed the medium in, the plurality of dry rovings, the nozzle being arranged downstream of the fiber conveying device in the fiber supplying direction;
a guiding path configured to guide the rovings into the slit-shape through gap of the nozzle,
a cooling device disposed downstream of the nozzle;
an intermediate conveying device disposed downstream of the nozzle in the fiber supplying direction;
a fiber-cutting device disposed downstream of the cooling device, the fiber-cutting device being configured to cut the plurality of rovings after the medium has been applied thereto;
a heating device disposed downstream of the fiber-cutting device in the fiber supplying direction, the heating device comprising an end heater that is configured to reheat the medium embedded in the rovings;
an outlet arranged downstream of the heating device in the fiber supplying direction, the outlet being configured to simultaneously lay the plurality of rovings on a workpiece carrier to manufacture a three-dimensional preform; and
a pressing roller disposed adjacent to the outlet and the heating device;
wherein:
the slit-shaped through gap has a nozzle width extending in a slit plane (l-b) that is perpendicular to the fiber supplying direction and a nozzle height extending in a thickness direction (d) that is perpendicular to the slit plane (l-b);
the nozzle width is equal to one of: (i) the roving width plus a margin of 0.025 to 0.2 mm in case a plurality of slit-shaped through gaps are respectively provided for the plurality of dry rovings, or (ii) the total roving width of all of the plurality of dry rovings plus a margin of 0.025 to 0.2 mm in case the plurality of dry rovings pass collectively through one slit-shaped through gap;
the nozzle height is equal to the roving thickness of the dry rovings in the thickness direction (d) plus a margin of 0.025 to 0.2 mm; and
the nozzle comprises a channel and dispenser system having a nozzle gap configured to lead the medium to the slit-shaped through gap, the nozzle gap having a gap width equal to the nozzle width plus an open width in the fiber supplying direction selected from the range of 0.025 to 1 mm.

2. The laying head according to claim 1, wherein:
a plurality of supply paths are respectively provided for the plurality of dry rovings, which are fed in through the inlet, such that the dry rovings are divided into a plurality of groups; and associated with each of said supply paths are one of said nozzle, one of said cooling device, one of said intermediate conveying device and one of said heating device.

3. The laying head according to claim 1, wherein the nozzle is configured to apply and embed the medium onto/into two sides of the rovings, the medium being selected from the group consisting of a liquid adhesive for fixing the rovings, a liquid binder for connecting the rovings, and a liquid resin for impregnating the rovings.

* * * * *